US010919697B2

(12) United States Patent
Hedley et al.

(10) Patent No.: US 10,919,697 B2
(45) Date of Patent: Feb. 16, 2021

(54) PLATE STORAGE ASSEMBLY (71) Applicant: JUSTOY PTY LIMITED, Mount Thorley (AU)

(72) Inventors: Robert Ian Hedley, Buttaba (AU); Christopher Nash Whybin, Hamilton (AU)

(73) Assignee: JUSTOY PTY LIMITED

( * ) Notice: Subject to any disclaimer, the term of this patent is extended or adjusted under 35 U.S.C. 154(b) by 0 days.

(21) Appl. No.: 16/310,279

(22) PCT Filed: Jun. 13, 2017

(86) PCT No.: PCT/AU2017/050587
§ 371 (c)(1),
(2) Date: Dec. 14, 2018

(87) PCT Pub. No.: WO2017/214666
PCT Pub. Date: Dec. 21, 2017

(65) Prior Publication Data
US 2019/0337718 A1 Nov. 7, 2019

(30) Foreign Application Priority Data
Jun. 14, 2016 (AU) ............................... 2016902306

(51) Int. Cl.
*B65G 1/04* (2006.01)
(52) U.S. Cl.
CPC .......... *B65G 1/04* (2013.01); *B65G 2201/022* (2013.01)
(58) Field of Classification Search
CPC ..................... B65G 1/04; B65G 2201/022
See application file for complete search history.

(56) References Cited

U.S. PATENT DOCUMENTS 2,526,823 A  10/1950 Mansfield
7,137,770 B2 * 11/2006 Ueda ................ B65G 1/0435
414/274

(Continued)

FOREIGN PATENT DOCUMENTS

EP  2638830 A1  9/2013

OTHER PUBLICATIONS

International Search Report and Written Opinion for International Application No. PCT/AU2017/050587, dated Jul. 25, 2017, 8 pages.

(Continued)

*Primary Examiner* — Stanton L Krycinski
(74) *Attorney, Agent, or Firm* — Patterson Thuente Pedersen, P.A.

(57) ABSTRACT

A storage assembly (10) has a plurality of trays (14), each tray (14) being selectively moved from the storage position (FIG. 1) to an access position (FIG. 2). The assembly (10) includes a rack (12) which has a series of rails (13) at each end on which trays (14) are supported. The storage assembly (10) includes a loading device (16) including lifting arms (18). The lifting arms (18) support a cradle (20) that includes rails (22), and the cradle (20) is connected to the lifting arms (18) by rollers (23). The loading device (16) can access different trays (14) by being raised and lowered. Once the lifting device (16) is moved into position adjacent a tray (14), the tray can be moved from the stored position on the rack (12) to the access position on the cradle (20) via a drawing arm (35).

19 Claims, 10 Drawing Sheets

(56) References Cited

U.S. PATENT DOCUMENTS

| | | |
|---|---|---|
| 2005/0036858 A1 | 2/2005 | Ueda |
| 2008/0093313 A1* | 4/2008 | Huber .................. B65G 1/0407 |
| | | 211/1.51 |
| 2012/0248046 A1* | 10/2012 | Warner .................. A47B 51/00 |
| | | 211/1.57 |
| 2014/0037420 A1 | 2/2014 | Frey et al. |

OTHER PUBLICATIONS

International Preliminary Report on Patentability for International Application No. PCT/AU2017/050587, dated Feb. 23, 2018, 12 pages.

* cited by examiner

PLATE STORAGE ASSEMBLY

The present application is a National Phase entry of PCT Application No. PCT/AU2017/050587, filed Jun. 13, 2017, which claims priority from Australian Patent Application No. 2016902306, filed Jun. 14, 2016, each of which is hereby fully incorporated herein by reference.

TECHNICAL FIELD

The present invention generally relates to storage devices and more specifically to an assembly for loading and storing plates, sheets, or the like.

BACKGROUND

Large plates, sheets and the like are used in a wide range of industries for a variety of uses. For example, steel road plates for covering holes, metal sheets for fences, roofs and the like, and plate steel for construction of bridges or other structures. These items when not in use or during transport are often simply stacked on one another or simply separated with simple packing material.

A simple pile of sheets only allows for the top sheet to be accessed and often does not adequately protect the sheets from damage. Depending on the particular product and number of items, there may also be a safety hazard caused by poor stacking and or poor use or failure of packing materials.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to one aspect, there is provided a storage assembly, including a rack, a tray and a loading device, wherein the loading device is configured to move the tray between a storage position on the rack and an access position. Preferably, the loading device is configured to support the tray when it is in the access position. In one form, the tray can be separated from the rack by the loading device.

In a preferred form, the rack is configured to hold a plurality of trays that can each be accessed by the loading device. This is advantageous as it allows any tray to be accessed at a given time. In one form, the access position is the same location for each of the trays. For example, the loading device may remove a tray from the rack and lower the tray to a position near the ground.

According to one example aspect, the loading device includes two lifting arms that support a cradle, wherein the tray is supported on the cradle when in the access position. Preferably, the rack supports the tray on rails, and the cradle also includes rails, such that moving the tray from the storage position to the access position transfers the tray from the rails of the rack to the rails of the cradle.

In one form, the loading device includes a drawing arm that is configured to move the tray between the storage position and the access position. In one example form, the drawing arm is pivotally connected to the cradle at a first end and includes an end roller at a second end, wherein the end roller cooperates with a channel in the tray, such that pivoting the drawing arm moves the end roller along the channel and thereby moves the tray between the storage position and the access position. In another example form, the drawing arm includes a support roller and the cradle includes an arcuate frame member, such that the support roller moves along the arcuate frame member to support the drawing arm throughout its rotation.

According to another aspect, the loading device can be moved to a stowed position when not in use. Preferably, the cradle is tilted when in the stowed position.

According to yet other optional aspects: the storage assembly further includes a first independent tray that is movable between a storage position and an access position without the use of the loading device; storage assembly further includes a second independent tray that is movable between a storage position and an access position without the use of the loading device and independently of the first independent tray; and one or both of the independent trays are supported by rollers on the ground or on rails.

According to a preferred aspect, the tray is configured to hold a steel sheet. In some optional forms, the tray is configured to hold and separately support a plurality of steel sheets and the loading device includes an ejecting device that can remove a lowermost steel sheet from the tray. In one example form, the ejecting device includes a plurality of rollers that are configured to eject the steel sheet horizontally from the tray. In other particular example forms, the tray includes a plurality of helical indexing devices to support the plurality of steel sheets, and the loading device includes a plurality of activators that engage the helical indexing devices.

According to another aspect, there is provided a vehicle, including a storage assembly substantially as described herein.

BRIEF DESCRIPTION OF FIGURES

Example embodiments should become apparent from the following description, which is given by way of example only, of at least one preferred but non-limiting embodiment, described in connection with the accompanying figures, wherein.

DETAILED DESCRIPTION

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Figure 1:
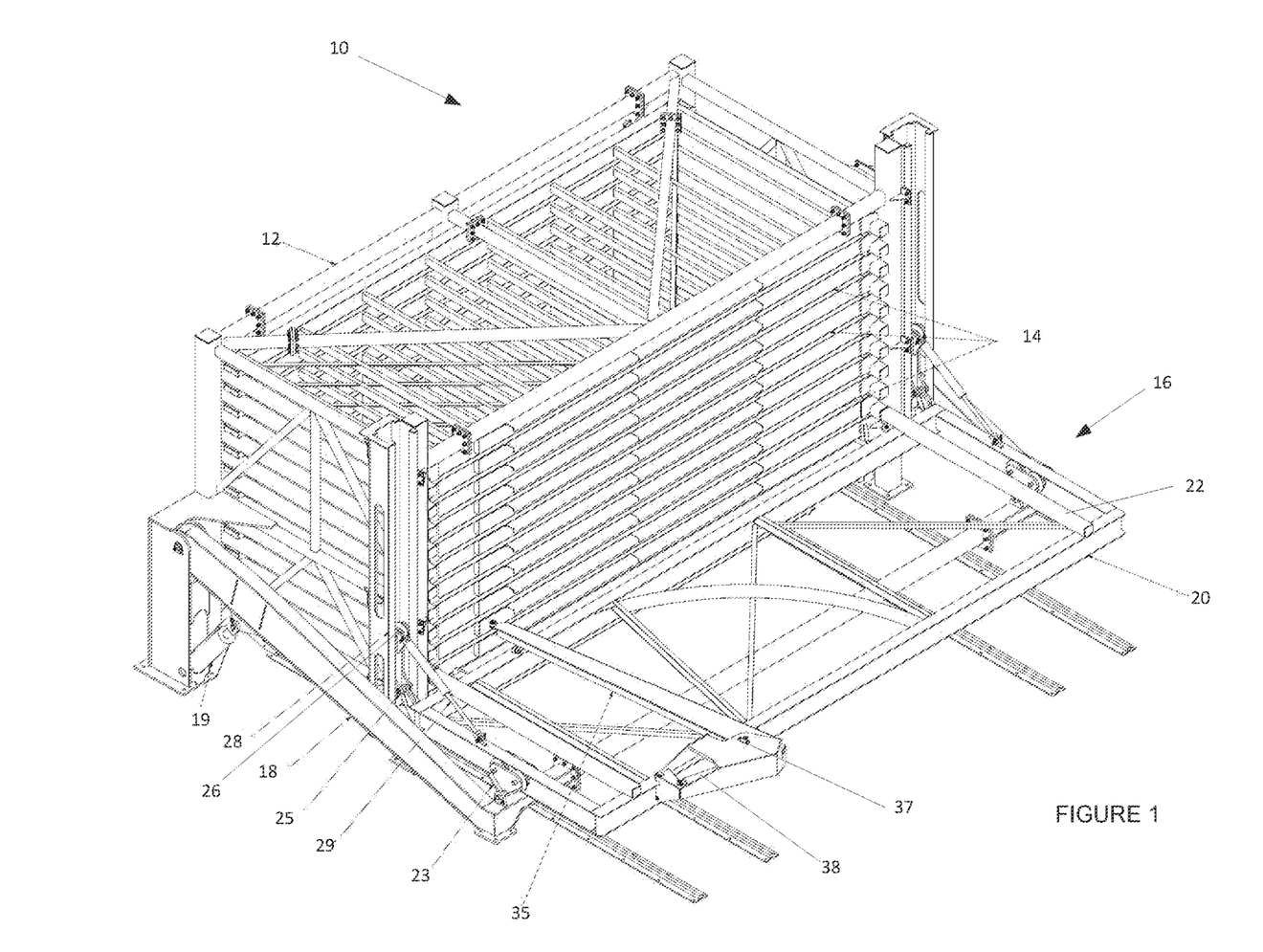
FIG. 1 illustrates an isometric view of a first embodiment of a storage assembly according to the present invention.

Referring to FIG. 1, a first embodiment of a storage assembly 10 is shown. The storage assembly includes a rack 12 that has a series of rails 13 at each end on which trays 14 are supported. The storage assembly 10 also includes a loading device 16 that can be used to move trays 14 between a storage position on the rack 12 and an access position substantially or completely removed from the rack 12.

The first embodiment of the storage assembly 10 is designed for storing steel plates. A tray 14 can be moved to the access position, a steel plate placed on the tray 14, and then the tray 14 returned to the storage position along with the steel plate.

The loading device 16 includes lifting arms 18 that are raised and lowered using actuators 19. The lifting arms 18 support a cradle 20 that includes rails 22. The cradle 20 is connected to the lifting arms 18 by rollers 23. The cradle 20 is also linked to the rack 12 by a linkage 25 that includes rollers 26 that move within a guide 28 that forms part of the rack 12. An actuator 29 also extends between the linkage 25 and the cradle 20 and acts to control the tilt of the cradle 20, as will be described in more detail below.

Figure 2:
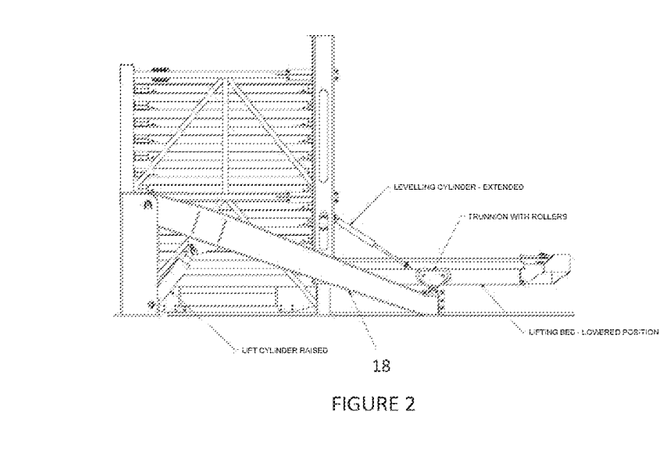
FIG. 2 illustrates an end view of the first embodiment with a lifting device in a lowered position.
Figure 3:
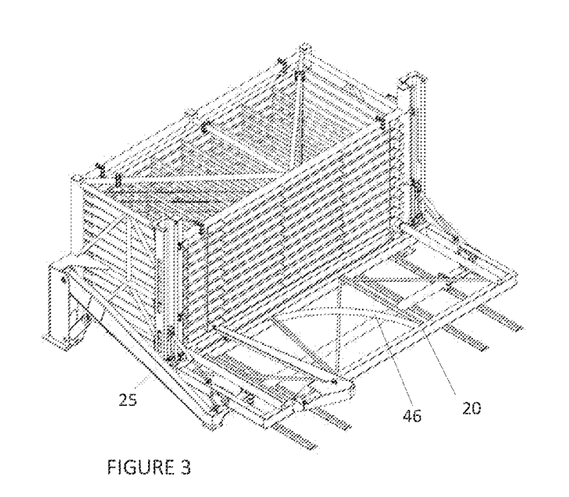
FIG. 3 illustrates an isometric view of the assembly of FIG. 2.
Figure 4:
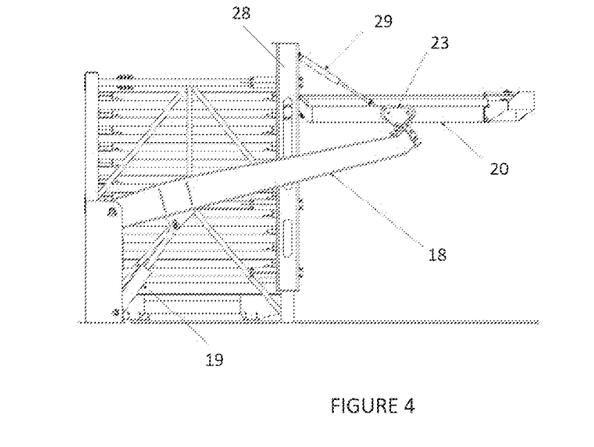
FIG. 4 illustrates an end view of the first embodiment with the lifting device in a raised position.
Figure 5:
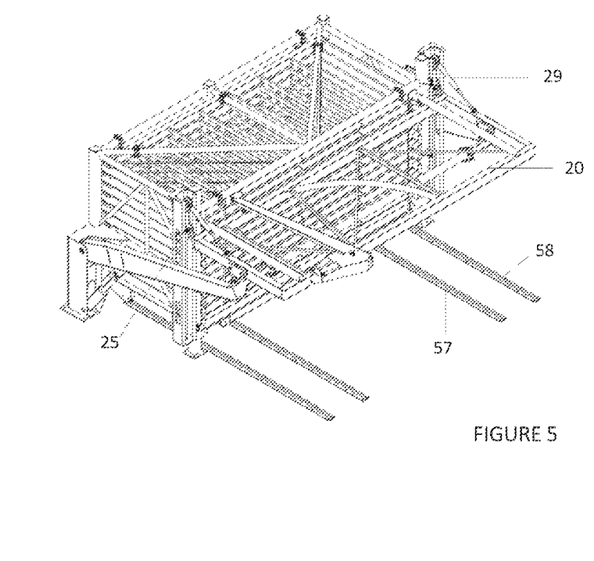
FIG. 5 illustrates an isometric view of the assembly of FIG. 4.
Figure 6:
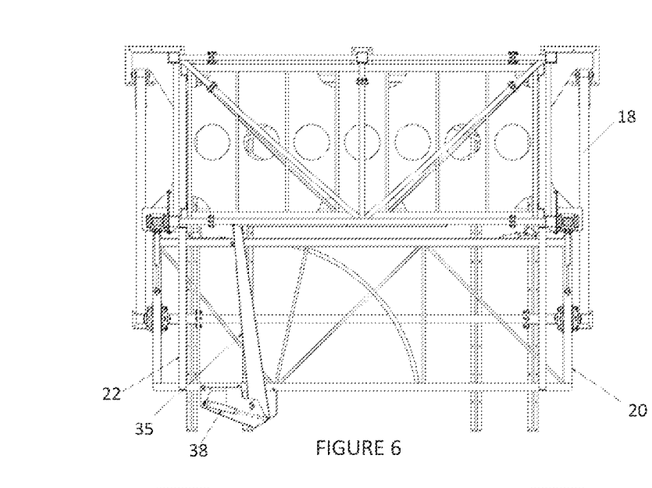
FIG. 6 illustrates a plan view of the first embodiment with a tray in a storage position.
Figure 7:
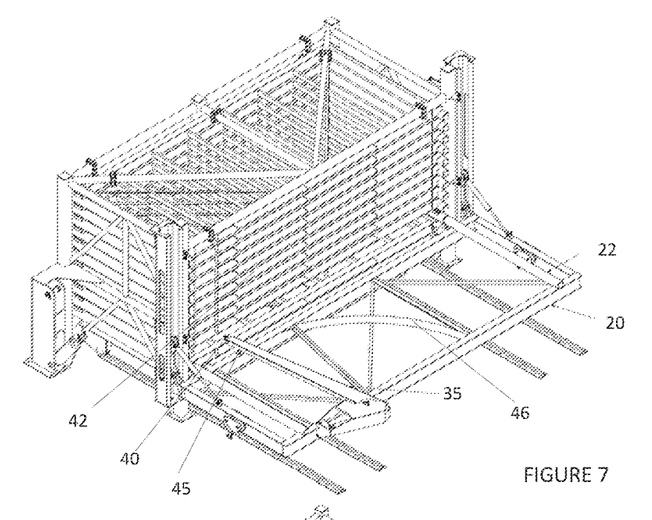
FIG. 7 illustrates an isometric view of the assembly of FIG. 6.
Figure 8:
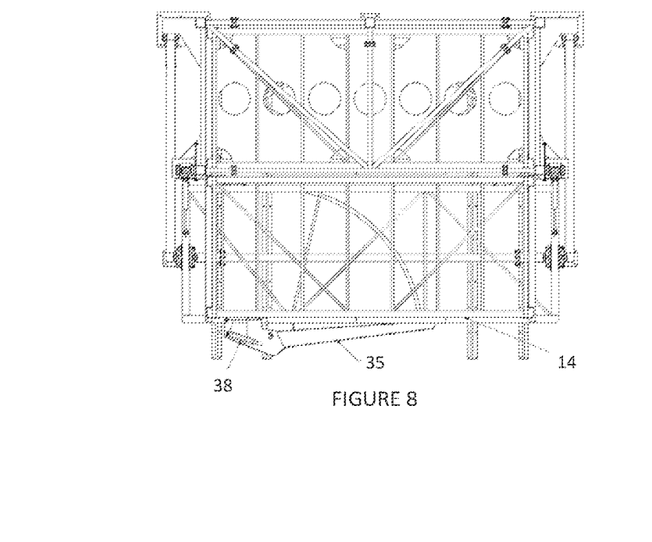
FIG. 8 illustrates a plan view of the first embodiment with the tray in an access position.

Referring to FIGS. 2 to 5, the loading device 16 can access different trays 14 by being raised and lowered. FIGS. 2 and 3 show the lifting device 16 in a lowered position while FIGS. 4 and 5 show the lifting device 16 in a raised position. To access a particular tray 14, the cradle 20 is raised or lowered so that the rails 22 of the cradle 20 align with a pair of rails 13 of the rack 12.

The lifting arms 18 operate by pivoting about a connection 32 as they are raised by the actuators 19. This causes the cradle 20 to move in a vertical manner, guided by the linkage 25 connecting the cradle 20 to the guide 28. The rollers 23 allow the cradle 20 to move vertically even though the ends of the lifting arms 18 are moving in an arcuate manner. The linkage 25 and the actuator 29 ensure that the cradle 20 remains level throughout its vertical travel.

Referring to FIGS. 6 to 9, once the lifting device 16 is moved into position adjacent a tray location, the particular tray 14 can be moved from the stored position on the rack 12 to the access position on the cradle 20. Movement of the tray 14 is achieved using the drawing arm 35, which is connected to the cradle 20 at a pivot point 37 and is moved using an actuator 38.

The drawing arm 35 has an end roller 40 at the opposite end to the pivot point 37. Each tray 14 includes an open ended channel 42 along the edge facing the cradle. As the drawing arm 35 pivots under the force of the actuator 38 the end roller 40 enters the channel 42. As the drawing arm continues to rotate, the end roller 40 continues to move along the channel and the arcuate movement of the end roller 40 causes it to pull the tray 14 out from the rack 12.

The drawing arm 35 also includes a support roller 45. The cradle 20 includes an arcuate frame member 46, so that as the drawing arm 35 rotates it is supported by the cradle 20 throughout its range of motion.

Figure 9:
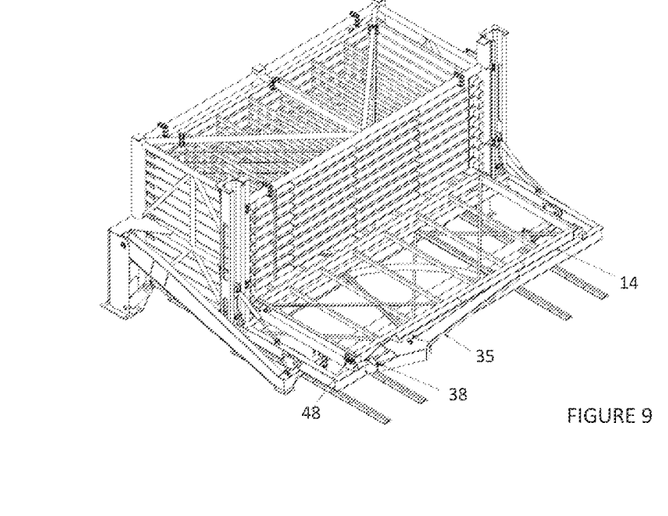
FIG. 9 illustrates an isometric view of the assembly of FIG. 8.

Each tray 14 includes tray rollers 48 that allow it to move along the rails 13 of the rack 12 as well as the rails 22 of the cradle 20. FIG. 9 shows that there is one set of tray rollers 48 near each corner of the tray 14. By positioning the cradle 20 so that the rails 22 of the cradle 20 align with the rails 13 of the rack, as described above, it allows the tray 14 to easily transfer from the rack 12 to the cradle 20 and back from the cradle 20 to the rack. The vertical movement of the cradle 20 when moving to different rack 12 locations also ensures that there is always minimal gap between the rails 13 of the rack 12 and the rails 22 of the cradle 20, thereby ensuring the tray 14 doesn't get stuck during the transfer.

Once a tray 14 is on the cradle 20, it may be moved to a particular location, such as lowered to near the ground, so that when items are loaded or unloaded from the tray 14, this process can happen at the same location regardless of where the tray 14 is stored. In an alternative embodiment, however, the trays 14 may function more like drawers, never being completely removed from the rack 12.

Figure 10:
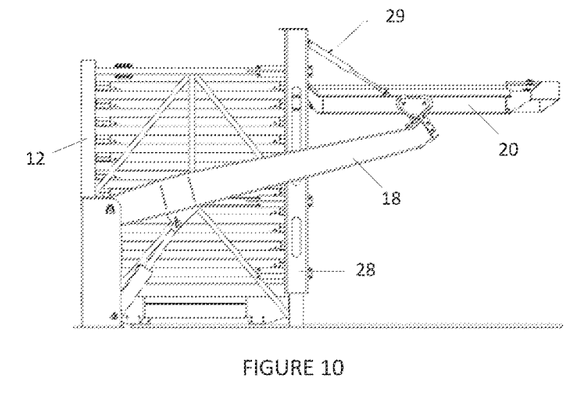
FIG. 10 illustrates an end view of the first embodiment with a cradle of the lifting device in a horizontal position and independent trays in storage positions.
Figure 11:
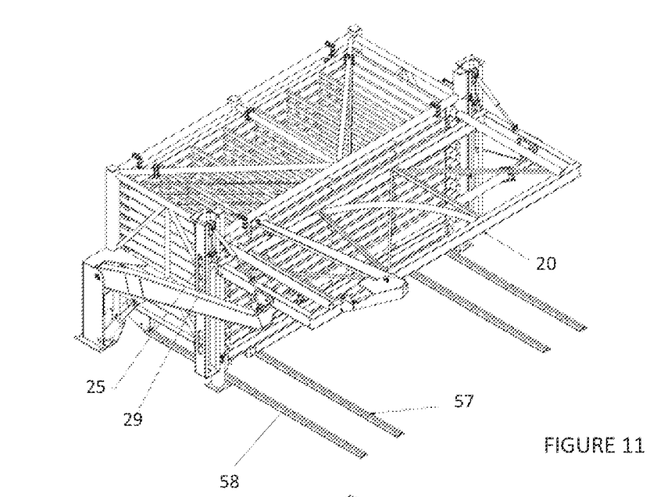
FIG. 11 illustrates an isometric view of the assembly of FIG. 10.
Figure 12:
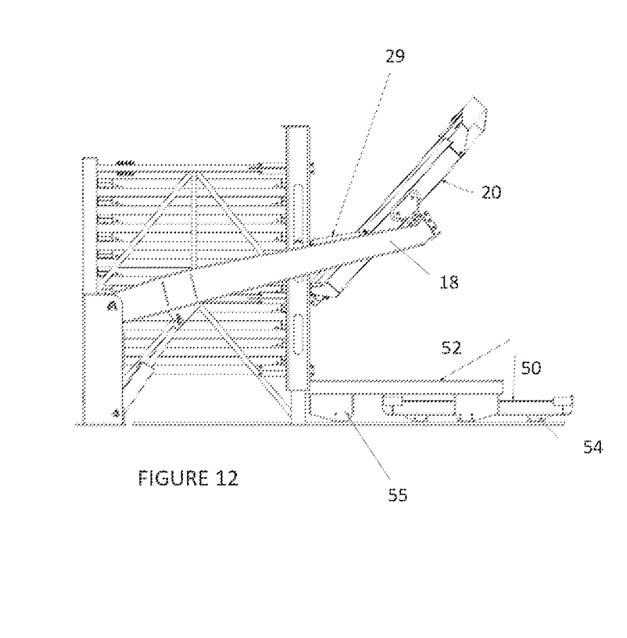
FIG. 12 illustrates an end view of the first embodiment with the cradle tilted and the independent trays in access positions.
Figure 13:
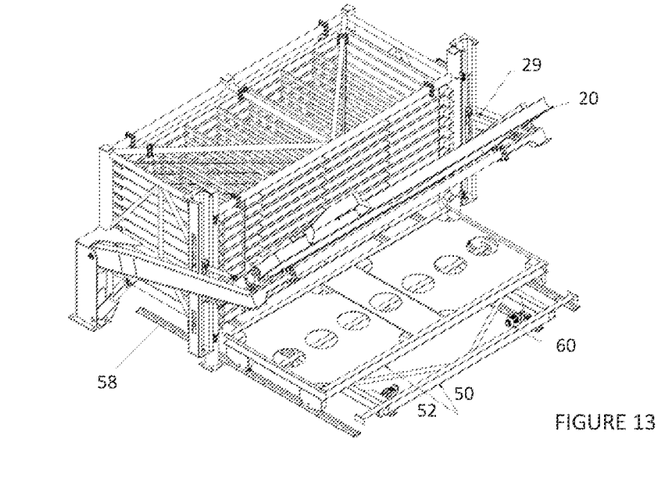
FIG. 13 illustrates an isometric view of the assembly of FIG. 12.
Figures 14, 15:
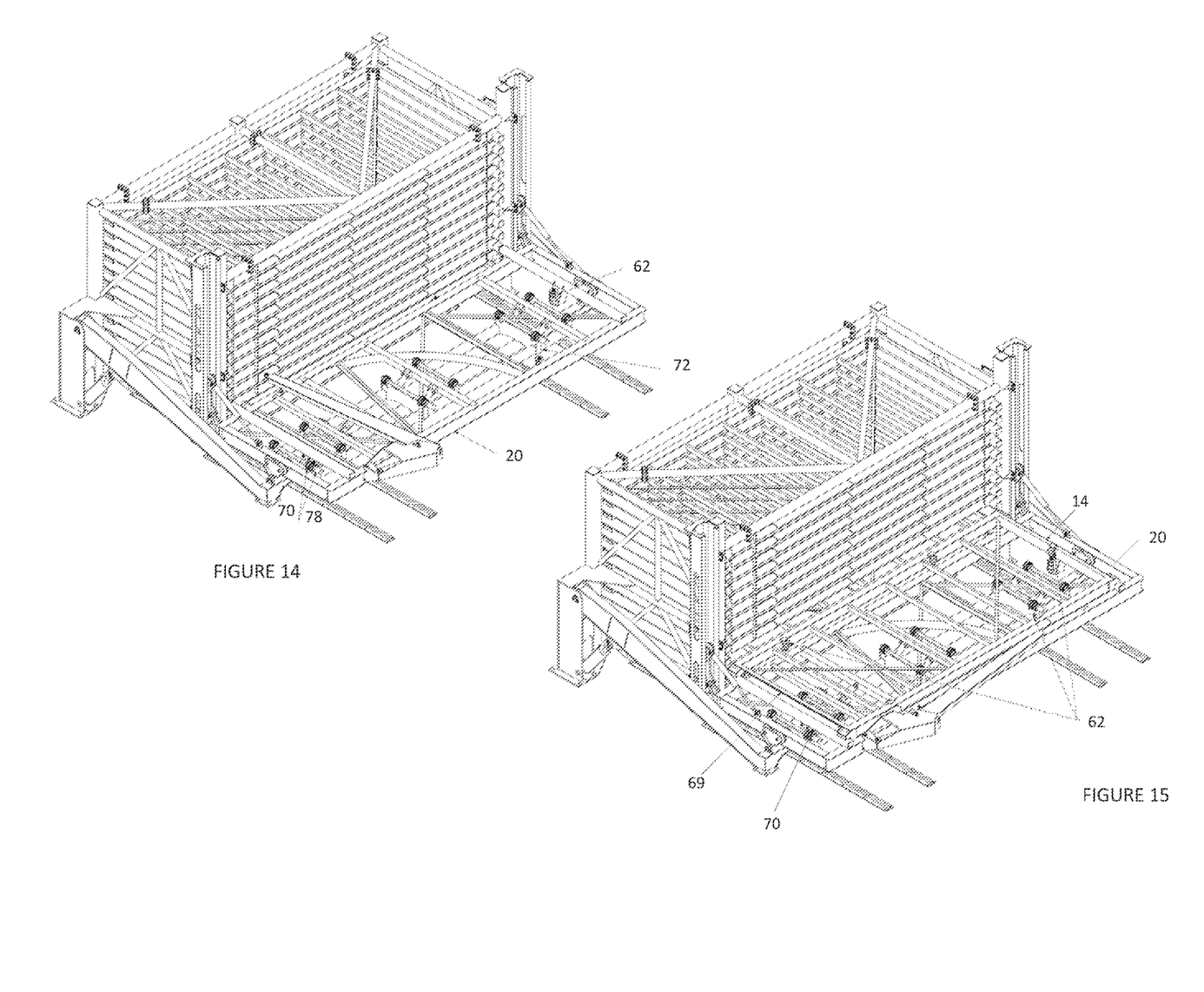
FIG. 14 illustrates an isometric view of a second embodiment of the invention with the trays all in storage positions.
FIG. 15 illustrates an isometric view of the second embodiment with one of the trays in the access position.

Referring to FIGS. 10 to 13, the loading device 16 can be moved to a stowed position when not in use. The cradle 20 is first moved to an upper position, as shown in FIGS. 10 and 11, before then being tilted, as shown in FIGS. 12 and 13. The tilting is controlled by the actuator 29 that is normally used to ensure the cradle 20 remains level. By retracting the actuator 29, the linkage 25 moves downward while the lifting arms 18 remain in a constant position, therefore causing the cradle 20 to tilt. This may be useful for reducing the overall size of the storage assembly 10 when not in use, or may be used to access lower independent trays, as is described in more detail below.

Referring to FIGS. 12 and 13, the storage assembly 10 includes a first independent tray 50 and a second independent tray 52. The first independent tray 50 is supported by rollers 54 that are located inwardly of rollers 55 that support the second independent tray 52. The rollers 54 of the first independent tray 50 move along a first set of tracks 57 while the rollers 55 of the second independent tray 52 move along a separate set of tracks 58. Motors 60 are mounted to the independent trays 50, 52 and are used to drive the trays 50, 52 between the access and storage positions.

In alternative embodiments the tracks 57, 58 may not be present, with the independent trays 50, 52 moving along the ground or other surface on which the storage assembly 10 is mounted. In yet other embodiments, any number of independent trays may be present, including more than two, however some embodiments may not have independent trays at all.

Referring to FIGS. 14 to 17, a second embodiment of the invention is shown where multiple items can be stored on a single tray 14. In particular, the trays 14 are designed to hold steel plates, and the embodiment shown can hold at least three plates on each tray 14.

The trays 14 include a series of helical indexing devices 62. The indexing devices 62 are in the form of a screw, with each tray 14 including six indexing devices 62, however more or less devices 62 may be used in other embodiments of the storage assembly 10. The cradle 20 includes drive motors 63 that can be raised by a jack 64 to engage and rotate the indexing devices 62 when the tray 14 is in the access position on the cradle 20.

Figure 16:
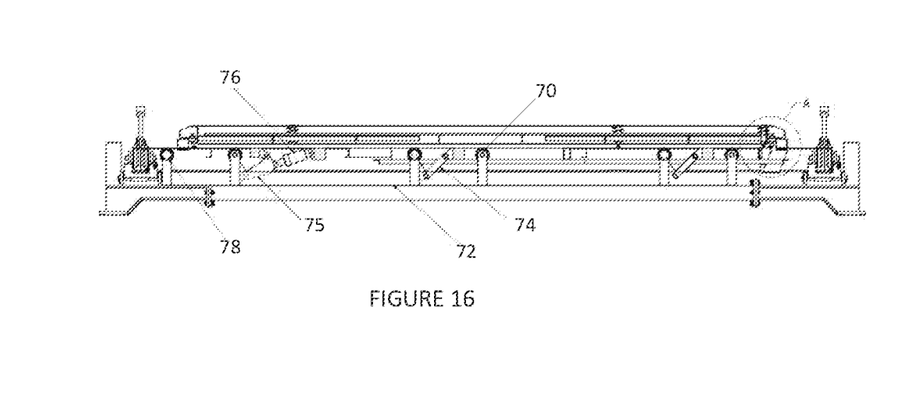
FIG. 16 illustrates a front view of the second embodiment with ejecting rollers in a lowered position.
Figure 16A:
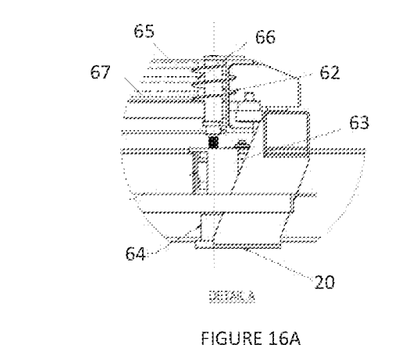
FIG. 16A illustrates an enlarged view of region A from FIG. 16.
Figure 17:
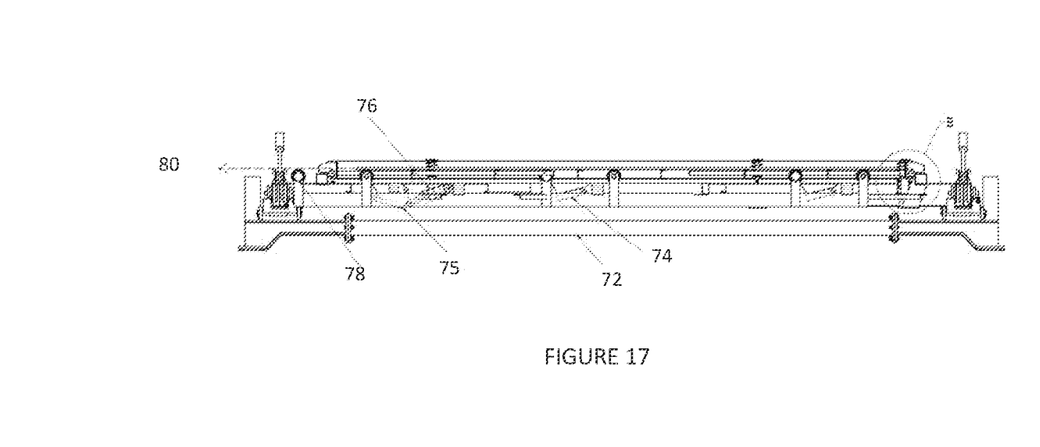
FIG. 17 illustrates a front view of the second embodiment with the ejecting rollers in a raised position.
Figure 17A:
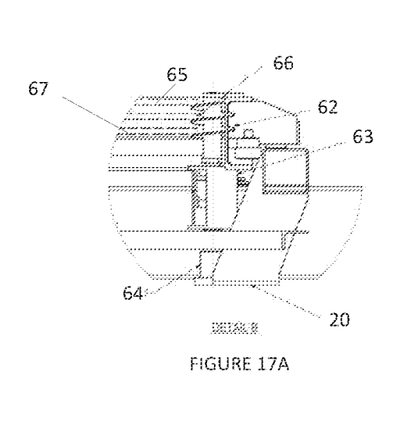
FIG. 17A illustrates an enlarged view of region B from FIG. 17.

In use, when loading plates onto a tray 14 a plate is lowered onto the indexing devices 62 into an upper position 65 as shown in FIG. 16A. The drive motors 63 are engaged as shown in FIG. 17A and the indexing devices rotated once to lower the plate to a second position 66 below the upper position 65. The process is repeated, with another plate being added and the indexing devices 62 rotated, so that the first plate added is now in the lowest position 67.

To remove plates from the tray 14, the above process may be reversed, however the present embodiment also includes a means for ejecting plates from an end of the tray 14. This ejecting means includes a slot 69 at an end of the tray 14 and a series of rollers 70 that form part of the cradle 20.

The rollers 70 are mounted on a frame 72 that can be raised using control arms 74, lift arms 75 and actuators 76. Raising the rollers 70 causes them to abut the bottom of the lowermost plate and raise it slightly so that it is no longer resting on the indexing devices 62. The plate is then driven out through the slot 69, as shown by arrow 80 in FIG. 17, using an ejecting drive motor 78.

In one embodiment, the storage assembly 10 may be located on and optionally anchored to the ground, such as in a warehouse, worksite or depot. In another embodiment, the storage assembly 10 may be mounted on a vehicle, such as on the tray of a truck or trailer, so that it can be easily transported to a worksite or other location where it is needed.

Figure 18:
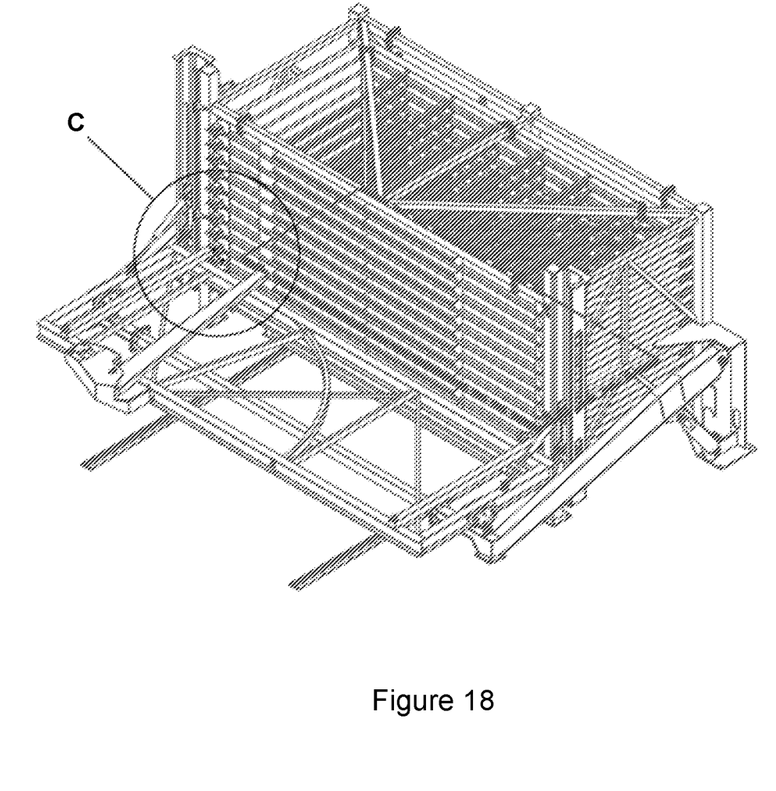
FIG. 18 illustrates an isometric view of the assembly, but depicting the region 'C' of the device which is shown in enlarged form in FIGS. 19 and 20.
Figure 19:
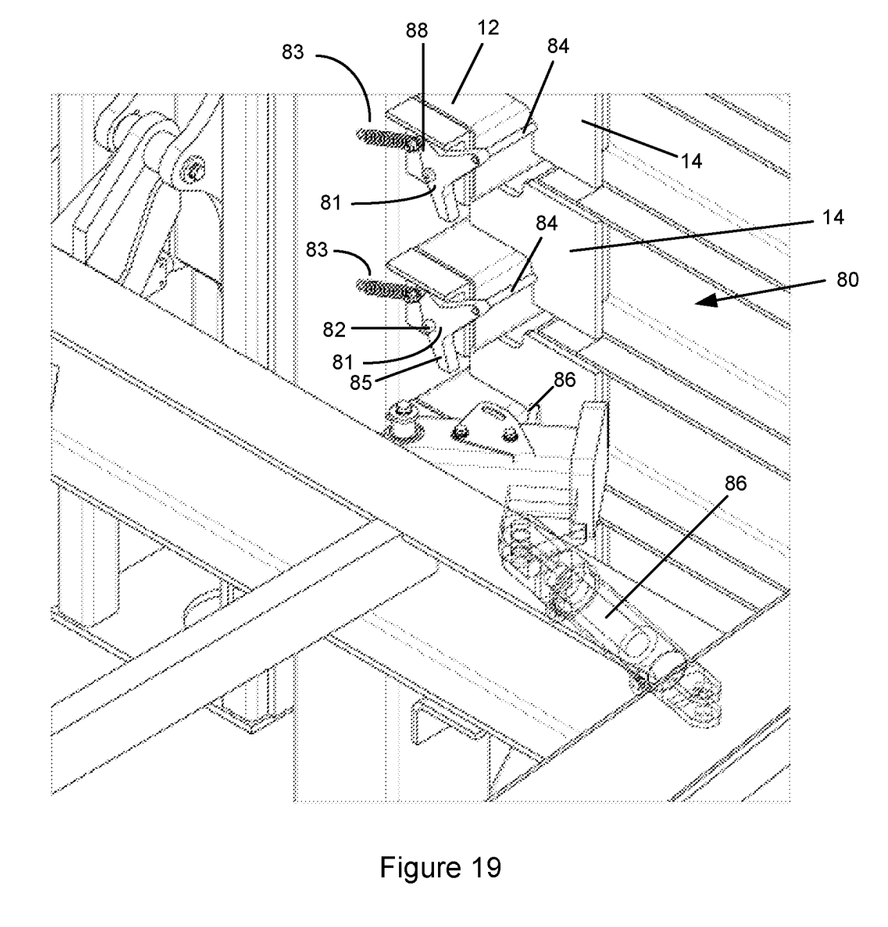
FIG. 19 illustrates an enlarged view of region 'C' shown in FIG. 18, with the locking device shown in a first position, wherein the trays are locked.
Figure 20:
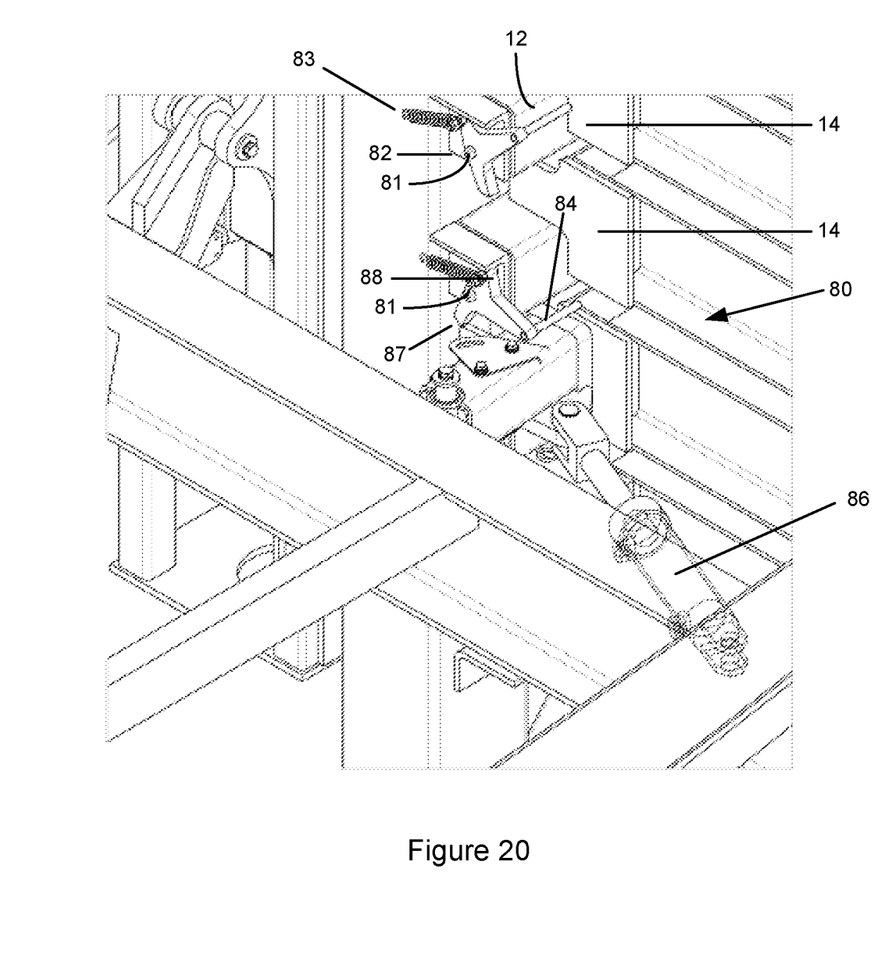
FIG. 20 illustrates an enlarged view of region 'C' shown in FIG. 19, with the locking device shown in a second position, wherein one of the trays is unlocked.
Figure 21:
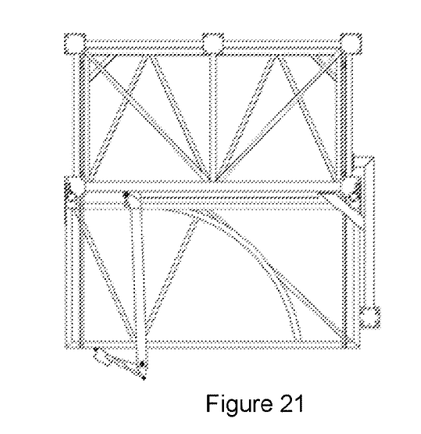
FIG. 21 illustrates a plan view of an alternative embodiment of the assembly with all trays in storage positions.
Figure 22:
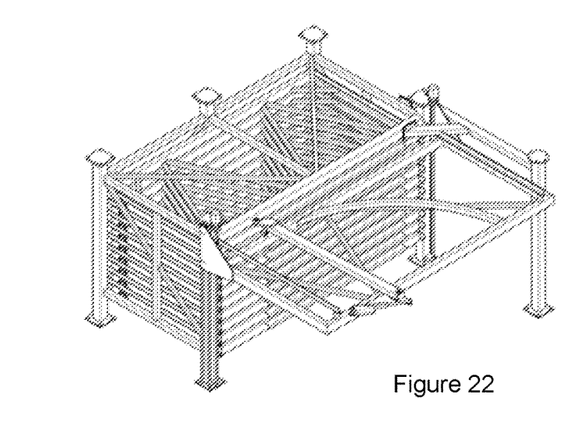
FIG. 22 illustrates an isometric view of the embodiment of the assembly of FIG. 21.
Figure 23:
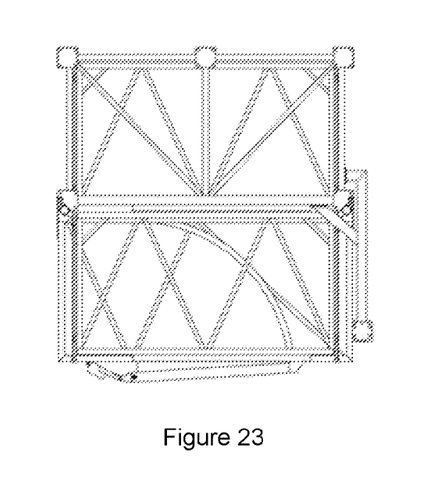
FIG. 23 illustrates a plan view of the alternative embodiment of the assembly of FIGS. 21 and 22 with one tray in the access position; and, FIG. 24 illustrates an isometric view of the embodiment of the assembly of FIG. 23.
Figure 24:
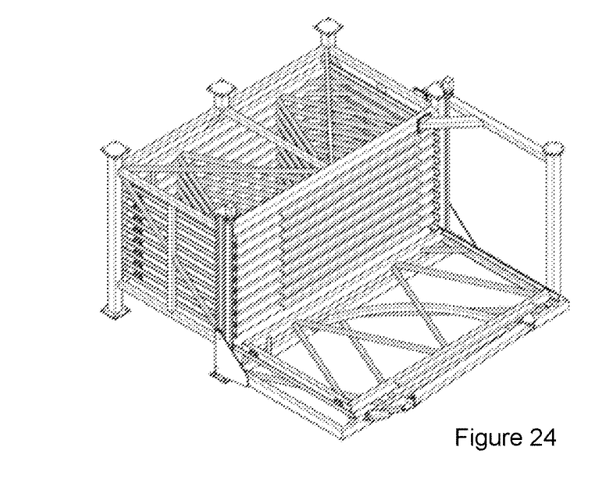

In FIG. 18 is shown an isometric view of the assembly shown in FIG. 1, but depicting a region 'C' of the device which is shown in an enlarged form in FIGS. 19 and 20. In particular, this region 'C' of the device shows a locking arrangement whereby an individual train may be selectively unlocked before it is pulled out from rack 12. The locking arrangement, generally designated by the numeral 80, as shown in FIGS. 19 and 20 shows a latch 81 being associated with each tray 14, which is substantially 'T' shaped, that is, it has three outwardly extending fingers.

Each latch 81 is pivotally attached to the side of rack 12 at pivotal connection 82. It is biased via a biasing means 83 being attached to finger 88, to normally be provided in a locked position, whereby finger 84 abuts the front of tray 14, thereby preventing the tray from moving outwardly from the rack 12. The latch 81 is operated by a movement of finger/arm 85 of the latch 81. Operation of the latch 81 to move it from its 'locked' position to an 'unlocked' position, against the bias of biasing spring 83, is affected by activation of hydraulic cylinder 86, whereby, upon appropriate extension of cylinder 86 from the position shown in FIG. 19 to the position shown in FIG. 20, a protruding member 87 is adapted to abut and move/push arm 85 on latch 81 such that it rotates about pivotal connection 82 against the bias of biasing means 86 to consequently move arm 84 away from the front of tray 14. Tray 14 is then free to be able to move outwards of the rack 12.

It will be appreciated that other forms of locking arrangement will become apparent to persons skilled in the art. All such locking arrangements should be considered to fall within the scope of this invention.

FIGS. 21 to 24 illustrate an alternative form of the assembly of the invention which might typically be used for more lightweight materials than the version described herein before. For example, whilst the embodiment of FIGS. 1 to 20 is particularly useful for storing metal sheet material, which is extremely heavy in weight, the alternative version of the invention, shown in FIGS. 21 to 24, is suited for more lightweight materials, for example, plywood, cardboard, or other sheet metal materials. In this form of the invention, due to the lighter weight of the plate material to be stored, the structural requirements are typically less than that required of the embodiment shown in FIGS. 1 to 20 and as such, some of the materials used to configure the assembly can be of more lightweight less rigid construction. Persons skilled in the art will readily identify that the lifting arms, drawing arms, actuators etc. shown in the previously described embodiment are not required in such a more lightweight construction and as such, some/all of these features are not shown in the embodiment represented in FIGS. 21-24.

Many modifications will be apparent to those skilled in the art without departing from the scope of the present invention.

The invention claimed is:

1. A storage assembly, comprising a rack, a tray and a loading device, wherein the loading device is configured to move the tray between a storage position on the rack and an access position, the loading device comprising two lifting arms that support a cradle, wherein the tray is supported on the cradle when in the access position and the loading device includes a drawing arm that is configured to move the tray between the storage position and the access position, wherein the drawing arm is pivotally connected to the cradle at a first end and includes an end roller at a second end, wherein the end roller cooperates with a channel in the tray, such that pivoting the drawing arm moves the end roller along the channel and thereby moves the tray between the storage position and the access position.

2. The storage assembly according to claim 1, wherein the loading device is configured to support the tray when it is in the access position.

3. The storage assembly according to claim 1, wherein the tray can be separated from the rack by the loading device.

4. The storage assembly according to claim 1, wherein the rack is configured to hold a plurality of trays that can each be accessed by the loading device.

5. The storage assembly according to claim 4, wherein the access position is the same location for each of the trays.

6. The storage assembly according to claim 1, wherein the rack supports the tray on rails, and wherein the cradle also includes rails, such that moving the tray from the storage position to the access position transfers the tray from the rails of the rack to the rails of the cradle.

7. The storage assembly according to claim 1, wherein the drawing arm includes a support roller and the cradle comprises an arcuate frame member, such that the support roller moves along the arcuate frame member to support the drawing arm throughout rotation.

8. The storage assembly according to claim 1, wherein the loading device can be moved to a stowed position when not in use.

9. The storage assembly according to claim 8, wherein the cradle is tilted when in the stowed position.

10. The storage assembly according to claim 1, wherein the storage assembly further comprises a first independent tray that is movable between a storage position and an access position without the use of the loading device.

11. The storage assembly according to claim 10, wherein the storage assembly further comprises a second independent tray that is movable between a storage position and an access position without the use of the loading device and independently of the first independent tray.

12. The storage assembly according to claim 11, wherein one or both of the first independent tray and the second independent tray are supported by rollers on the ground or on rails.

13. The storage assembly according to claim 1, wherein the tray is configured to hold a steel sheet.

14. The storage assembly according to claim 1, wherein the tray is configured to hold and separately support a plurality of steel sheets.

15. The storage assembly according to claim 14, wherein the loading device comprises an ejecting device that can remove a lowermost steel sheet from the tray.

16. The storage assembly according to claim 15, wherein the ejecting device comprises a plurality of rollers that are configured to eject the steel sheet horizontally from the tray.

17. The storage assembly according to claim 14, wherein the tray comprises a plurality of helical indexing devices to support the plurality of steel sheets.

18. The storage assembly according to claim 17, wherein the loading device comprises a plurality of activators that engage the helical indexing devices.

19. The storage assembly according to claim 1, wherein the storage device comprises a lock adapted to normally selectively lock the tray when in the storage position.

* * * * *